United States Patent
Shantharam

(10) Patent No.: US 11,709,063 B2
(45) Date of Patent: Jul. 25, 2023

(54) METHOD AND SYSTEM FOR RENDERING A SAFE NAVIGATION ROUTE

(71) Applicant: KAHA PTE. LTD., Singapore (SG)

(72) Inventor: Sudheendra Shantharam, Bengaluru (IN)

(73) Assignee: KAHA PTE. LTD., Singapore (SG)

( * ) Notice: Subject to any disclaimer, the term of this patent is extended or adjusted under 35 U.S.C. 154(b) by 148 days.

(21) Appl. No.: 16/959,421

(22) PCT Filed: Dec. 26, 2018

(86) PCT No.: PCT/SG2018/000008
§ 371 (c)(1),
(2) Date: Jun. 30, 2020

(87) PCT Pub. No.: WO2019/132770
PCT Pub. Date: Jul. 4, 2019

(65) Prior Publication Data
US 2020/0333150 A1    Oct. 22, 2020

(30) Foreign Application Priority Data
Dec. 30, 2017   (IN) .............. 20171 1047437

(51) Int. Cl.
*G01C 21/34* (2006.01)
*G01C 21/36* (2006.01)

(52) U.S. Cl.
CPC ..... *G01C 21/3461* (2013.01); *G01C 21/3492* (2013.01); *G01C 21/3617* (2013.01)

(58) Field of Classification Search
CPC .......... G01C 21/3461; G01C 21/3492; G01C 21/3617; G01C 21/00; G01C 21/34; G01C 21/36
See application file for complete search history.

(56) References Cited

U.S. PATENT DOCUMENTS

| | | | | |
|---|---|---|---|---|
| 2009/0210142 | A1* | 8/2009 | Couckuyt | G01C 21/3461 701/532 |
| 2012/0150429 | A1* | 6/2012 | Siotos | G01C 21/3617 701/411 |
| 2012/0150430 | A1* | 6/2012 | French | G01C 21/3453 701/425 |
| 2017/0248437 | A1* | 8/2017 | Thompson | G01C 21/3453 |
| 2017/0279957 | A1* | 9/2017 | Abramson et al. | H04M 1/6075 |
| 2018/0238698 | A1* | 8/2018 | Pedersen | G06N 5/048 |

\* cited by examiner

*Primary Examiner* — Anne Marie Antonucci
*Assistant Examiner* — Patrick M Brady
(74) *Attorney, Agent, or Firm* — Perilla Knox & Hildebrandt LLP; Kenneth A. Knox

(57) ABSTRACT

Disclosed is a method of providing a safe navigation route for travelling. The method comprises receiving, at a graphical user interface of a processor-based user device, a query for a navigation route from a user, comprising a source station and a destination station, determining, at an application server, a plurality of navigation routes between the source station and the destination station, analyzing, at the application server, each of the plurality of navigation routes to compute a safety index associated with each of the plurality of navigation routes, identifying, at the application server, at least one safe navigation route between the source station and the destination station, and rendering, at the graphical user interface, the at least one safe navigation route between the source station and the destination station in response to the query from the user.

20 Claims, 3 Drawing Sheets

METHOD AND SYSTEM FOR RENDERING A SAFE NAVIGATION ROUTE

TECHNICAL FIELD

The present disclosure relates to the field of computer implemented navigation systems. Furthermore, the present disclosure also relates to method of providing a safe navigation route for travelling. Moreover, the present disclosure also relates to system for providing a safe navigation route for travelling.

BACKGROUND

Navigation is one of the primary requirements of a user while performing day to day personal or business activities. With an advent of technology, typically the user gains access to a mobile application which is configured to provide details of one or more navigation routes between a source station and a destination station. The one or more navigation routes are determined depending on a minimum time or distance required to travel between the two stations. At times, the user selects a specific navigation route as per his requirements and traverses through the specific navigation route to reach the destination station.

However, the conventional system for providing a navigation route includes a variety of problems. For example, the conventional system does not provide a secured and safe route from source to destination station. Some conventional systems which considers the security issues in the navigational route, are inefficient and further provide a route which is unsafe as well as time-consuming. Such conventional systems consider historical data of the route and indicate the safest route based on the historical data which is irrelevant. As a result, current security information related to navigation route doesn't include real time security issues in the navigation route.

Therefore, in light of the foregoing discussion, there exists a need to overcome the aforementioned drawbacks associated with the conventional system for providing a specific navigation route for a user.

SUMMARY

The present disclosure seeks to provide an improved safe navigation system to a user.

According to a first aspect, an embodiment of the present disclosure provides a method of providing a safe navigation route for travelling, wherein the method comprises:
 receiving a query for a navigation route from a user, from a processor-based user device, wherein the query comprises at least one of source station and destination station;
 determining a plurality of navigation routes between the source station and the destination station, at an application server communicably coupled to the processor-based user device;
 analyzing each of the plurality of navigation routes in real-time to compute a safety index associated with each of the plurality of navigation routes, at the application server, wherein the safety index is computed based on one or more location specific data associated with each of the navigation routes;
 identifying at least one safe navigation route between the source station and the destination station based on the one or more location specific data associated therein, at the application server; and
 transmitting the at least one safe navigation route between the source station and the destination station, to the processor-based user device, in response to the user's query.

The present disclosure seeks to provide a safe navigation route for travelling, thus enabling the user to substantially overcome problems associated with travelling safely through a geographical area.

According to a second aspect, an embodiment of the present disclosure provides a system for providing a safe navigation route for travelling, wherein the system comprises:
 a receiver configured to receive from a processor-based user device a query for a navigation route, wherein the query comprises at least one source station and a destination station from a user; and
 an application server communicably coupled to the processor-based user device, wherein the application server is operable to:
  determine a plurality of navigation routes between the source station and the destination station;
  analyze each of the plurality of navigation routes in real-time to compute a safety index associated with each of the plurality of navigation routes, wherein the safety index is computed based on one or more location specific data associated with each of the navigation routes;
  identify at least one safe navigation route between the source station and the destination station, based on the one or more location specific data associated therein; and
  transmit the at least one safe navigation route between the source station and the destination station in response to the query from the user.

It will be appreciated that features of the present disclosure are susceptible to being combined in various combinations without departing from the scope of the present disclosure as defined by the appended claims.

DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION OF EMBODIMENTS

In overview, embodiments of the present disclosure are concerned with determining a safe navigation route to the user.

Figure 1:
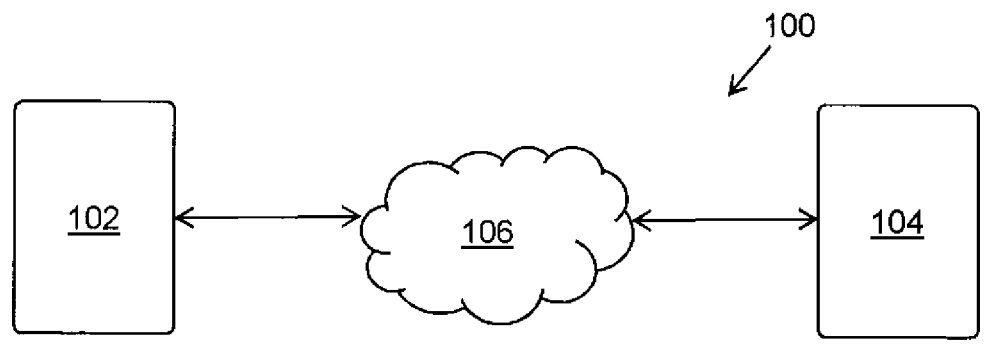
FIG. 1 is a block diagram of a system for providing a safe navigation route for travelling, in accordance with an embodiment of the present disclosure.

Referring to FIG. 1, there is shown a block diagram of a system 100 for providing a safe navigation route for travelling, in accordance with an embodiment of the present disclosure. As shown the system 100 comprises a processor-based user device 102 and an application server 104. Furthermore, the processor-based user device 102 and the application server 104 is communicably coupled to each other via a communication network 106.

The present disclosure provides a system 100 for providing a safe navigation route for travelling. The system 100 is configured, namely operable, to identify, select and provide information related to a safe navigation travel route. In the present disclosure, the term "system" as used herein relates to an arrangement including programmable and/or non-programmable components that is configured to manage the information associated with various travelling routes from a specific source location to a specific destination location preferred by a user. It will be appreciated that the term "user" as used herein relates to a person (i.e., human being) or a virtual personal assistant (an autonomous program or a bot) using a device (namely the processor-based user device 102) and/or system (namely the system 100) described herein. Furthermore, the term "safe navigation route" as used herein relates to an information (graphical or textual) associated with a roadway or a collection of roadways that can be provided to the user via the programmable component of the system 100. Moreover, the information (graphical or textual) associated with a roadway or a collection of roadways can be used by the user for travelling from one geographical location to another geographical location. In operation, the system 100 uses a method of providing a safe navigation route for travelling. Furthermore, the method of providing a safe navigation route for travelling comprises one or more step implements using the various components of the system 100, namely the processor-based user device 102 and the application server 104.

Figure 2:
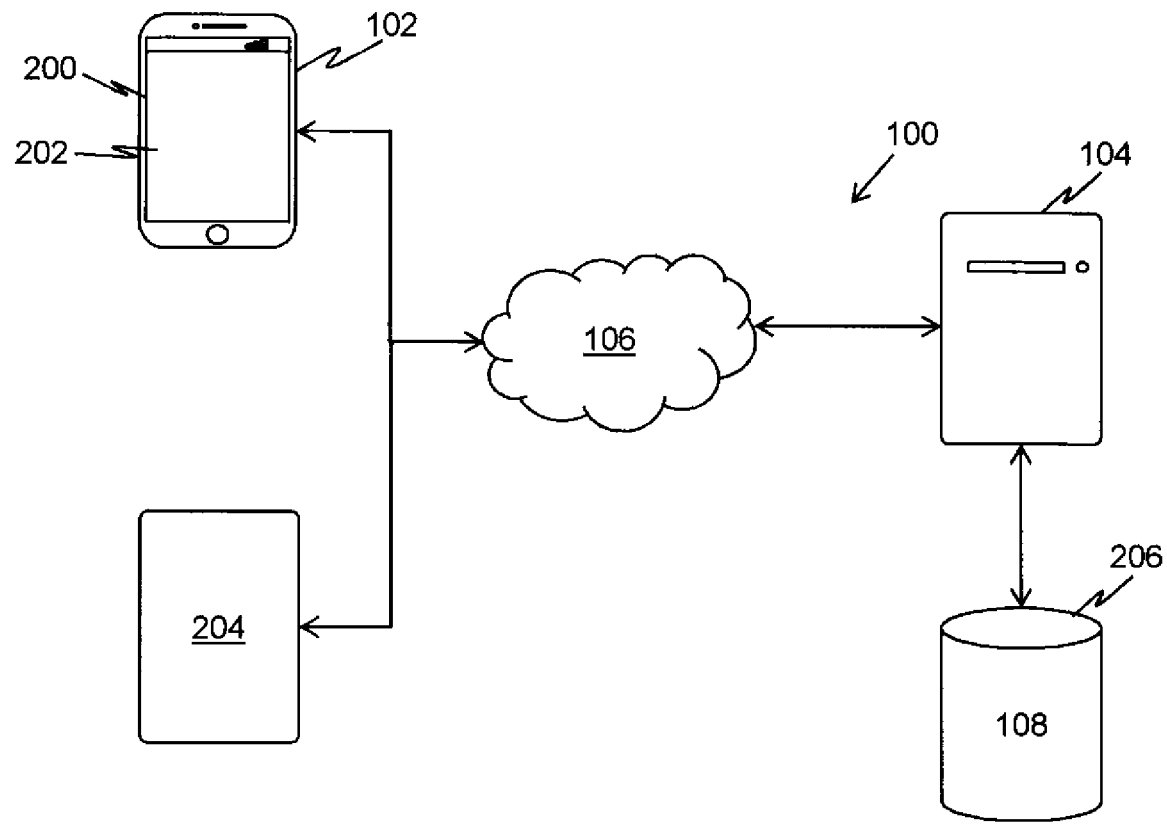
FIG. 2 is a schematic illustration of the system for providing a safe navigation route for travelling of FIG. 1, in accordance with an embodiment of the present disclosure.

Referring to FIG. 2, there is shown a schematic illustration of the system 100 for providing a safe navigation route for travelling in accordance with an embodiment of the present disclosure. As shown, the system 100 comprises the processor-based user device 102 and the application server 104 communicably coupled to each other via the communication network 106. Furthermore, the system 100 comprises a secondary user device 204 communicably coupled to the processor-based user device 102, and to the application server 104 through the communication network 106. Additionally, the system 100 comprises a database 206 communicably coupled to the application server 104. According to the present disclosure, system 100 comprising the processor-based user device 102 provides a graphical user interface 202. The processor-based user device 102 also comprises a display unit 200 for displaying the graphical user interface 202.

In the present disclosure, the term "processor-based user device" as used herein relates to an electronic device associated with (or used by) a user that is capable of enabling the user to perform specific tasks associated with the aforementioned system/method, such as providing one or more geographical routes for travelling. The processor-based user device 102 is any user-operated electronic device that includes a processor and/or controller. Furthermore, the processor-based user device 102 is intended to be broadly interpreted to include any type of electronic device that may be used for voice and/or data communication over a wireless communication network. Examples of the processor-based user device 102 include, but are not limited to, cellular phones, personal digital assistants (PDAs), handheld devices, bands, watches, laptop computers, personal computers, etc. Moreover, processor-based user device 102 can alternatively be referred to as a mobile station, a mobile terminal, a subscriber station, a remote station, a user terminal, a terminal, a subscriber unit, an access terminal, etc. Additionally, the processor-based user device 102 includes a casing, a memory, a network interface card, a microphone, a speaker, a keypad, and the like. Moreover, the processor-based user device 102 is to be construed broadly, so as to encompass a variety of different types of mobile stations, subscriber stations or, more generally, communication devices, including examples such as a combination of a data card inserted in a laptop.

Furthermore, the display unit 200, included in the processor-based user device 102 used to display the graphical user interface 202, and enables the users to communicate with the processor-based user device 102. Optionally, the display unit 200 is operable to receive input from the user and display various types' information (graphical and textual) as an output to be considered by the user. Optionally, the display unit 200 can include the plurality of electronic components, namely, a substrate; an organic light emitting structure on a substrate; a thin film encapsulation layer, a thin film encapsulation layer covering the organic light and the like.

In the present disclosure, the term "graphical user interface" as used herein relates to a structured set of user interface elements rendered on a display screen. Optionally, the graphical user interface 202 rendered on the display screen is generated by any collection or set of instructions executable by an associated digital system. Additionally, the graphical user interface 202 is operable to interact with the user to convey graphical and/or textual information and receive input from the user. Furthermore, the graphical user interface 202 elements refer to visual objects that have a size and position in graphical user interface 202. A user interface element may be visible, though there may be times when a user interface element is hidden. A user interface control is considered to be a user interface element. Text blocks, labels, text boxes, list boxes, lines, and images windows, dialogue boxes, frames, panels, menus, buttons, icons, etc. are examples of user interface elements. In addition to size and position, a user interface element may have other properties, such as a margin, spacing, or the like.

The graphical user interface 202, wherein the graphical user interface 202 is operable to receive a query for a navigation route, comprising a source station and a destination station from the user. The user is operable to use the display unit 200 of the processor-based user device 102 to provide the query for the navigation route. In the present disclosure, the term "query" as used herein relates to an input from the user requesting a specific information from the system 100 mentioned herein. The query may be an information requested from travelling, a rating request, a polling request and the like. Specifically, the query is a request for information related to a navigation route, comprising a source station and a destination station from the user. In the present disclosure, the term "navigation mute" as used herein relates to a combination of one or more paths, one or more geographic location points associated to the one or more paths and directional information for navigating using the one or more paths. Furthermore, the source station and the destination station comprising the navigation route may further contain one or more geographic location points associated with the one or more route. The source station as used herein refers to a geographical location from which the user prefers to initiate the navigation. Optionally, the source station may be manually provided by the user via the graphical user interface 202 rendered in the display unit 200 of the processor-based user device 102. Alternatively, an information related to the source station can be autonomously acquired by the processor-based user device 102 through one or more location-based technologies. For example, the processor-based user device 102 may autonomously acquire the GPS coordinated of the current location of the processor-based user device 102 operated by the user. The destination station as used herein refers to a geographical location from which the user prefers to terminate the navigation. In an embodiment, the destination station may be manually provided by the user via the graphical user interface 202 rendered in the display unit 200 of the processor-based user device 102. In an embodiment, the geographical location is showed in a map.

Optionally, the text boxes included in the graphical user interface 202 can be used by the user to provide an input requesting navigation route from the source station and the destination station. Furthermore, the graphical user interface 202 may include a specific text box for acquiring information related to the source station and the destination station. In an embodiment, the user may plot the geographical location (for example, a destination station) on a map. The plotting of geographical location is considered as an input to the system and the source station is considered as a user's current location. Subsequently, based on the provided source station and the destination station a navigation route can be rendered on the graphical user interface 202 as an output for the user.

The system 100 comprises the application server 104 communicably coupled to processor-based user device 102. In the present disclosure, the term "application server" as used herein relates to a structure and/or module that include programmable and/or non-programmable components configured to store, process and/or share information with the processor-based user device, secondary user device and database. Optionally, the application server 104 includes an arrangement of physical or virtual computational entities capable of enhancing information to perform various computational tasks. Furthermore, it should be appreciated that the application server 104 may be both a single hardware server and/or plurality of hardware servers operating in a parallel or distributed architecture. In an example, the application server 104 may include components such as memory, a processor, a network adapter and the like, to store, process and/or share information with other computing components, such as user device/user equipment, namely the processor-based user device 102. Optionally, the application server 104 is implemented as a computer program that provides various services (such as database service) to other devices, modules or apparatus.

Optionally, the database 206 communicably coupled to the application server 104 is configured to store various data acquired and/or received by the application server 104. In the present disclosure, the term "database" as used herein relates to an organized body of digital information regardless of the manner in which the data or the organized body thereof is represented. Optionally, the database 206 can be a hardware, software, firmware and/or any combination thereof. For example, the organized body of related data may be in the form of a table, a map, a grid, a packet, a datagram, a file, a document, a list or in any other form. The database 206 can include any data storage software and systems, such as, for example, a relational database like IBM DB2 and Oracle 9. Optionally, the database 206 can be operable to support relational operations, regardless of whether it enforces strict adherence to the relational model, as understood by those of ordinary skill in the art. Additionally, the database 206 is populated by data elements to be stored in cells of the database 206. Furthermore, the data elements may include data records describing query for a navigation route from a user, plurality of navigation routes, one or more locations in each of the navigation routes, inputs provided by one or more entities associated with the one or more locations in each of the navigation routes, traffic density associated with the one or more locations in each of the navigation routes, a population index of the one or more locations in each of the navigation routes, an availability of one or more safe houses at the one or more locations in each of the navigation routes, a noise level of the one or more locations in each of the navigation routes, an illumination level at the one or more locations in each of the navigation routes, a quality index of the one or more locations in each of the navigation routes, one or more physiological data associated with one or more entities associated with the one or more locations in each of the navigation routes, activities associated with the one or more entities, physiological parameters associated with the one or more entity, health parameters associated with the one or more entities, and the like.

Optionally, the application server 104 is communicably coupled to processor-based user device 102 via a communication network 106. In the present disclosure, the term "communication network" as used herein relates to an arrangement of interconnected programmable and/or non-programmable components that are configured to facilitate data communication between one or more electronic devices, namely the processor-based user device 102 and the communication network 106, whether available or known at the time of filing or as later developed. Furthermore, the network may include, but is not limited to, one or more peer-to-peer network, a hybrid peer-to-peer network, local area networks (LANs), radio access networks (RANs), metropolitan area networks (MANS), wide area networks (WANs), all or a portion of a public network such as the global computer network known as the Internet, a private network, a cellular network and any other communication system or systems at one or more locations. Additionally, the network includes wired or wireless communication that can be carried out via any number of known protocols, including, but not limited to, Internet Protocol (IP), Wireless Access Protocol (WAP), Frame Relay, or Asynchronous Transfer Mode (ATM). Moreover, any other suitable protocols using voice, video, data, or combinations thereof, can also be employed. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols.

The application server 104 is operable to analyze and determine a plurality of navigation routes between the source station and the destination station. The application server 104 is operable to receive the query for the navigation route provided by the user via the graphical user interface 202 rendered on the display unit 200 of the processor-based user device 102. Furthermore, the application server 104 is operable to receive data related to the source station and the destination station from the processor-based user device 102.

Optionally, the application server 104 is operable to use an application program interface (API) hosted herein, to acquire one or more possible navigation routes between geographical locations of the source station and the destination station from a data repository that stores data related to one or more routes, locations and the like. Alternatively, the application server 104 is operable to use an application program interface (API) hosted herein, to acquire one or more possible navigation routes between geographical locations of the source station and the destination station from a third-party service provider, such as a service provider map service.

The application server 104 is operable to analyze each of the plurality of navigation routes to compute a safety index associated with each of the plurality of navigation routes. The application server 104 is configured to host one or more set of instructions, computer programs and/or routines for analyzing each of the plurality of navigation routes. Optionally, the one or more set of instructions, computer programs and/or routines hosted in the application server 104 is configured determine the safety index for the one or more paths, one or more geographic location points in the each of the plurality of navigation routes. Furthermore, the one or more set of instructions, computer programs and/or routines are used to determine the safety index associated with each of the plurality of navigation routes. Subsequently, a digital map including the safe navigation route between the source station and the destination station (to be rendered in the graphical user interface 202 rendered in the display unit 200 of the processor-based user device 102) is formed by the one or more set of instructions, computer programs and/or routines hosted in the application server 104. In the present disclosure, the term "safety index" as used herein relates to a numerical value that is assigned to each of the plurality of navigation routes upon being analyzed by the one or more set of instructions, algorithms, computer programs and/or routines hosted in the application server 104. For example, the numerical value assigned to each of the navigation routes may be any one of 1, 2, and 3 (1 being the highest safety index and 3 being the lowest safety index). In such example, if a specific navigation route is assigned 1, the navigation route may be considered as the safest route and if a specific navigation route is assigned 3, the navigation route may be considered as the most unsafe route and the like.

Optionally, the one or more set of instructions, computer programs and/or routines hosted in the application server 104, are used to determine the safety index of one or more paths, one or more geographic location points in the each of the plurality of navigation routes. Optionally, the safety index for the one or more paths, one or more geographic location points in each of the navigation route is determined at a specific time stamp, i.e. the one or more set of instructions, algorithms, computer programs and/or routines hosted in the application server 104 are configured to calculate the safety index for the one or more paths, one or more geographic location points in each of the navigation route after a regular time interval. Beneficially, the determining safety index for the one or more paths, one or more geographic location points in each of the navigation route enables the system 100 to repeatedly check if a specific route is safe to travel through in a real time. In an embodiment, the application server may also list the safety index of route with respect to the time. For example, a route may be very safe during 11 AM, but the same route may be very dangerous after 10 PM, hence this route is suggested to the user after LOAM. The application server further considers possible vulnerabilities based on the time quoted by the user and determine the safety route. If time factor is not given by the user, the server automatically considers the current time and further computes the safety route. In another embodiment, the safety route may be divided into different segments with one or more checkpoints/tolls. Furthermore, the determining safety index for the one or more paths, one or more geographic location points in each of the navigation route enables the system 100 to determine different routes for safe travelling if a previously selected route is predicted to be unsafe for travelling upon the analysis of the navigation route.

Optionally, the one or more set of instructions, algorithms, computer programs and/or routines hosted on the application server 104, can be configured to determine safety index for a specific location (at least one of the one or more paths, one or more geographic location points in each of the navigation route) at a specific time. For example, the one or more set of instructions, algorithms, computer programs and/or routines hosted in the application server 104 may determine a safety index for a geographic location point "X" at 8 am. It will be appreciated that the application server 104 is configured to determine the safety index for the geographic location point "X" at 8 am upon receiving a query from the user via the processor-based user device 102. Optionally, the application server 104 is configured to store a history of the queries made by the user, and subsequently, use such query history to autonomously determine a safety index for preferred location of the user. It will be appreciated that the preferred location of the user is a geographic location point for which the user has repeatedly queried for determining safety index. For example, the user, at morning 8 am, queries to determine a safety index of geographical location point "I" at time 10 pm, for consecutive 20 days. In such event the application server 104 is configured to display at time 8 am in the graphical user interface 202 of the processor-based user device 102 used by the user the safety index of the geographical location point "I" for 10 pm.

The safety index is also computed based on a desolation index associated with each of the navigation routes. The one or more set of instructions, algorithms, computer programs and/or routines hosted in the application server 104 are configured to calculate the safety index based on a desolation index associated with each of the navigation routes. In the present disclosure, the term "desolation index" as used herein relates to a numerical value that is assigned to each of the plurality of navigation routes upon being analyzed by the one or more set of instructions, computer programs and/or routines hosted in the application server 104. Optionally, the desolation index is operable to identify the safety conditions of the one or more paths, one or more geographic location points in each of the navigation route.

Optionally, the desolation index is computed using an emotional index and one or more location specific parameters. The one or more set of instructions, computer programs and/or routines hosted in the application server 104 are configured to calculate the emotional index and one or more location specific parameters of the one or more paths, one or more geographic location points in each of the navigation route.

In the present disclosure, the term "emotional index" as used herein relates to a numerical value representing the emotion of the one or more paths, one or more geographic location points in each of the navigation routes between the source station and the destination station. Furthermore, the emotional index is calculated by the one or more set of instructions, algorithms, computer programs and/or routines hosted in the application server 104 by analyzing the emotions of one or more entity (explained herein later) associated to the one or more geographic location points in each of the navigation route between the source station and the destination station.

Optionally, the emotional index is computed based on inputs provided by one or more entities associated with the one or more locations in each of the navigation routes. Optionally, the one or more entities as used herein refers to one or more individuals, organizations residing in the one or more paths, and one or more geographic location points in each of the navigation route that is operable to communicate with the application server 104. Furthermore, the one or more entities associated with the one or more locations in each of the navigation routes is operable to provide inputs via the secondary user device 204. Optionally, the secondary user device 204 is similar to the processor-based user device 102. For example, the secondary user device 204 may be any user-operated electronic device that includes a processor and/or controller, a display unit, a graphical user interface and the like. Furthermore, the secondary user device 204 is intended to be broadly interpreted to include any electronic device that may be used for voice and/or data communication over a wireless communication network. In an example, wherein a location in a navigation route between the source station and the destination station may be a geographic location point of an organization, namely an educational institute such as a school, college and other institute dealing in the delivery of education-related services. It will be appreciated that personnel associated with the educational institute (namely, students, teachers, or other stakeholders of the educational institute) may provide inputs via the secondary user device 204 individually and/or collectively for the educational institute. Furthermore, in such example, the majority students (such as 90% of the total number of students associated to the educational institute) may provide inputs indicating a relatively higher stress level for the geographic location point of the educational institute. Therefore, the location of the educational institutions may be considered as unsafe.

Optionally, the emotional index may be automatically determined for a specific location using the inputs of the one or more entities associated with specific location in real time. For example, a routine can be hosted by the application server 104 that is configured to independently monitor, record and update such inputs of the one or more entities associated with a specific location in real time. Beneficially, the inputs from the one or more entities are regularly incorporated in the application server 104, therefore a user traveling through a route can constantly monitor the safety index of the route. Furthermore, the application server 104 can also suggest a new route to the user based on the inputs provided by the one or more entities. In case of rented cars/cabs/autos, the application server stores the profiles of such driver and their historic activity data. While, determining the safety index, the profiles of the drivers are considered in real-time. In an embodiment, the application server may also suggest the user to choose appropriate mode of travel and frames a travel plan, from the source station to destination station employed with the safest route. The mode of travel may be one of or combination of, bus, auto, metro, cab etc. Further, the application server also considers the density of people in such transportation at different time stamps, and appropriately suggest the travel plan to the user. In an embodiment, the application server also considers the real-time climatic conditions (such as heavy rain, flood, water clogging, earth quake or any other natural calamity) to suggest a safety route to the user. In another embodiment, electricity/power supply in a location is considered for suggesting a safety route.

Optionally, the emotional index is computed based on traffic density associated with the one or more locations in each of the navigation routes. Optionally, the application server 104 is operable to acquire from a third party application the information relating to, a number of vehicles traveling via the one or more paths, one or more geographic location points in the each of the plurality of navigation routes. In an example, vehicles traveling through a path of a first navigation route is less than a path of a second navigation route. In such example, the one or more set of instructions, algorithms, computer programs and/or routines hosted in the application server 104 is configured to determine that the second navigation route is better than the first navigation route, since the safety is determined based on density and movement of vehicles. In this case, more number of vehicles are observed in the second route than first route. Optionally, the traffic density associated with the one or more locations in each of the navigation routes can be provided by the one or more entities associated with the one or more locations via the secondary device.

Optionally, the one or more location specific parameters comprises a population index of the one or more locations in each of the navigation routes. Optionally, the population index for the one or more locations in each of the navigation routes is calculated based on the number of electronic devices involved in data communication via a data network, such as BLUETOOTH® networks, public or private wireless networks and the like. Optionally, the application server 104 is configured to determine the population index based on the number of secondary user device 204 of a specific location of one or more locations connected to the application server 104. Optionally, the population index for a specific area may be calculated by the application server 104 by acquiring the information related to the number of electronic devices involved in data communication via data network in the specific area from a third-party service provider and the number of secondary user device 204 connected to the application server 104 in the specific area. It will be appreciated that the specific area refers to one of the geographical location points in the one or more locations in one of the navigation routes. Optionally, the application server 104 may be configured to autonomously acquire the number of electronic devices involved in data communication and wireless networks for a specific area based on their proximities to the processor-based user device 102 and/or the secondary user device 204, and subsequently determine the population index for the specific area.

Optionally, the one or more location specific parameters comprises an availability of one or more safe houses at the one or more locations in each of the navigation routes. Optionally, one or more safe houses refers to a secure location accessible from one or more geographic location points and/or the one or more paths in each of the navigation routes. Examples of a safe house may include a hospital, a police outpost, a friend's house, a secured building and the like. Optionally, the application server 104 is operable to determine a navigation route to be safe wherein the number of safe houses is more in number. Subsequently, the application server 104 is configured to select the navigation route with a higher number of safe houses as a safe route. Optionally, the one or more entities can use the secondary user device 204 to provide information related to safety status of a safe house to the application server 104. Therefore, the application server 104 is operable to identify one or more safe houses accessible from one or more geographic location points and/or the one or more paths in each of the navigation routes and subsequently, provide the information to the user travelling through one of the navigation routes.

Optionally, the one or more location specific parameters comprises noise level of the one or more locations in each of the navigation routes. Optionally, the noise level refers to the sounds in the one or more geographic locations in each of the navigation routes. Optionally, the application server 104 is configured to determine a location with the higher noise level as a safe location. Furthermore, the application server 104 is configured to determine a location with higher noise level based on a predefined threshold level. In an example, if a determined noise level is greater than the threshold noise level for a specific location, the specific location is rated as a safe location. In another example, the specific location is rated as an unsafe location if the determined noise level is lesser than the threshold noise level. Optionally, the application server 104 is configured to determine a real-time safety of a location based on the real-time noise level of the location.

Optionally, the one or more location specific parameters comprises an illumination level at the one or more locations in each of the navigation routes. Optionally, the illumination level at the one or more locations in each of the navigation routes refers to the amount of light available in the one or more locations in each of the navigation routes. Optionally, the application server 104 may be operable to communicate with one or more electronic device (configured with a light sensor) that is capable of determining the amount of light in the one or more locations in each of the navigation routes. Furthermore, the application server 104 is configured to identify a location of a navigation route with high illumination level to a safer location than a location of another navigation route with comparative lower illumination level. Optionally, the application server 104 may be operable to acquire information related to the electrical power supply for one or more locations in each of the navigation routes. In an example, if the information related to the electrical power supply for a location describes the continuous availability of power for a predefined time period (such as from 4:00 PM to 5 AM) then the application server 104 may be configured to determine the location as a safe location.

The safety index is computed based on one or more location specific data associated with each of the navigation routes. The one or more set of instructions, algorithms, computer programs and/or routines hosted in the application server 104 are configured to calculate the safety index based on the one or more location specific data associated with each of the navigation routes. In the present disclosure, the term "location specific data" as used herein relates to information that is acquired and/or received for each of the plurality of navigation routes and analyzed by the one or more set of instructions, algorithms, computer programs and/or routines hosted in the application server 104. Optionally, the location specific data is operable to identify the safety conditions of the one or more paths, one or more geographic location points in each of the navigation route.

Optionally, the one or more location specific data used to compute the safety index comprises a quality index of the one or more locations in each of the navigation route. Optionally, the quality index of the one or more locations in each of the navigation route refers to a condition of living in the one or more locations. Furthermore, the quality index may be calculated by the application server 104 based on inputs provided by the one or more entities associated with the one or more location. For example, the one or more location may be a hotel, school, restaurant, and other private or public location such as a home for a differently abled people, elderly people, old age homes and the like. In such example, the one or more entities may provide input related to the condition of living in the one or more locations via the secondary user device 204. Furthermore, the one or more set of instructions, algorithms, computer programs and/or routines hosted in the application server 104 may be configured to determine the quality index based on the input.

Optionally, the one or more location specific data used to compute the safety index comprises one or more physiological data associated with one or more entity associated with the one or more locations in each of the navigation routes. The one or more physiological data associated with one or more entity is operable to describe the physiological condition of the one or more entity. For example, a physiological data of an entity may describe the stress levels of the entity. In such example, the secondary user device 204 may be operable to provide the application server 104 with the physiological data describing the stress levels of the entity associated to a location in a navigation route. Furthermore, in such example, the one or more set of instructions, algorithms, computer programs and/or routines hosted in the application server 104 may be configured to determine the quality index based on the physiological data acquired therein. Furthermore, if the received physiological data associated with one or more entities associated with the one or more locations of a navigation route shows a high-stress levels, the one or more set of instructions, algorithms, computer programs and/or routines hosted in the application server 104 may be configured to determine navigation route as unsafe. Optionally, the physiological data comprises activities associated with the one or more entity. For example, the activities associated with the one or more entity number of steps taken by an entity while walking, amount time spent in sleeping, amount of time spent while performing other cartographic activities, and the like. Optionally, the physiological data comprises physiological parameters associated with the one or more entity. For example, physiological parameters may include electrocardiography or pulse-oximetry data of the bodies of the one or more entity. Optionally, the physiological data comprises health parameters associated with the one or more entity. For example, the health parameters may include the temperature, blood pressure, stress levels, and the like. Furthermore, such information associated with the one or more physiological data is acquired by the secondary user device 204 used by the entity and sent to the application server 104 to be analyzed by the one or more set of instructions, algorithms, computer programs and/or routines hosted therein.

Optionally, the secondary user device 204 is a smart wearable device associated with an entity associated with a location in a navigation route. Optionally, the secondary user device 204 is operable to autonomously acquire the physiological data associated with the one or more entity, such as one or more activities of the user, health parameters of the user and one or more physiological parameters and the like, through one or more sensors. Furthermore, secondary user device 204 can be configured to automatically send the physiological data to the application server 104 to be analyzed by the one or more set of instructions, computer programs and/or routines hosted therein.

Optionally, the application server 104 is operable to determine a mood associated with the one or more locations in each of the navigation routes at a specific timestamp. Optionally, the application server 104 is operable to determine a mood of a location based on the safety index associated with the location. For example, a relatively higher safety index of the specific location indicates that the users at the specific location are feeling safe and hence, appear to be in a stress-free mood at the specific location. Optionally, the application server 104 is operable to determine a mood of a location in real time based on the real-time information about the one or more physiological parameters of the one or more entity acquired via the secondary user device 204. For example, a heart rate of an entity is determined and based on the heart rate, a respective mood of the entity is determined. Alternatively, the system is configured to receive inputs from the entity present at the specific location on whether the entity is feeling stressed or anxious. Based on the inputs provided by the entity, the moods of the specific location are recorded and indicated to the user planning to follow the navigation route within which the specific location is located.

Optionally, the mood associated with the one or more locations in each of the navigation routes may be determined by the application server 104 based on a data acquired from third party service provider. In an example, the data may include geographical, content, news (e.g., past or present incidents), real-time instances, various events (e.g., past, ongoing, and upcoming events), police data, curated information from web/internet, SOS data (e.g., a number of times SOS pressed at the specific location), a number of times around me is seen by users in that location, a number of people in a network have marked the location as residence, official, an important locality information such as police stations, hospital details with their types, pharmacies, hotels, public transports-stations, or government buildings. Optionally, the data collected by the application server 104 is processed, structured, indexed and forwarded to the database 206. The processed data is encrypted and securely stored in the database 206 for various other purposes, such as, for analyzing the stored data, determining a trend in the stored data, use the data to train a machine learning algorithm and the like.

The application server 104 is operable to identify at least one safe navigation route between the source station and the destination station, based on the desolation index and one or more location specific data associated therein. The one or more set of instructions, algorithms, computer programs and/or routines hosted in the application server 104 is configured to analyze the desolation index and one or more location specific data associated with each of the plurality of navigation routes, and thereafter determine the at least one safe navigation route between the source station and the destination station. In an example, the plurality of navigation routes between the source station and the destination station may be "A" and "B". In such example, the route "A" may include a comparatively superior desolation index and one or more location specific data than the route "B". In such example, the one or more set of instructions, algorithms, computer programs and/or routines hosted in the application server 104 is configured to determine the route "B" as the at least one safe navigation route between the source station and the destination station.

Optionally, the application server 104 is operable to determine safety index for one or more locations found within the at least one safe navigation route at a specific time stamp.

The safety index for one or more locations may be determined at a specific timestamp after a specific time period. As a result, a real-time safety index is determined. Subsequently, the application server 104 is operable to select the real time safety index to determine the safe navigation route for traveling in a real time. Therefore, the application server 104 may identify a different safe navigation route between the source station and the destination station at different times based on the safety data associated with the respective routes. For example, the application server 104 is operable to monitor if the route "B" displays superior desolation index and one or more location-specific data than the route "A" during the specific timestamp. In such event, the one or more set of instructions, algorithms, computer programs and/or routines hosted in the application server 104 is configured to identify in real time that the route "A" as the at least one safe navigation route between the source station and the destination station.

The application server 104 is operable to render the at least one safe navigation route between the source station and the destination station in response to the query from the user. The one or more set of instructions, algorithms, computer programs and/or routines hosted in the application server 104 is configured to send the identified at least one safe navigation route between the source station and the destination station to the processor-based user device 102. Thereafter, the processor-based user device 102 is configured to display the at least one safe navigation route on the graphical user interface 202 to be viewed by the user. Optionally, the application server 104 is further operable to generate a real-time safety heat map to be rendered on the graphical user interface 202. Optionally, the application server 104 is operable to generate the real-time safety heat map based on the received input from the one or more entity in the form of feedback, suggestions, comments, favourites and the like.

Figure 3:
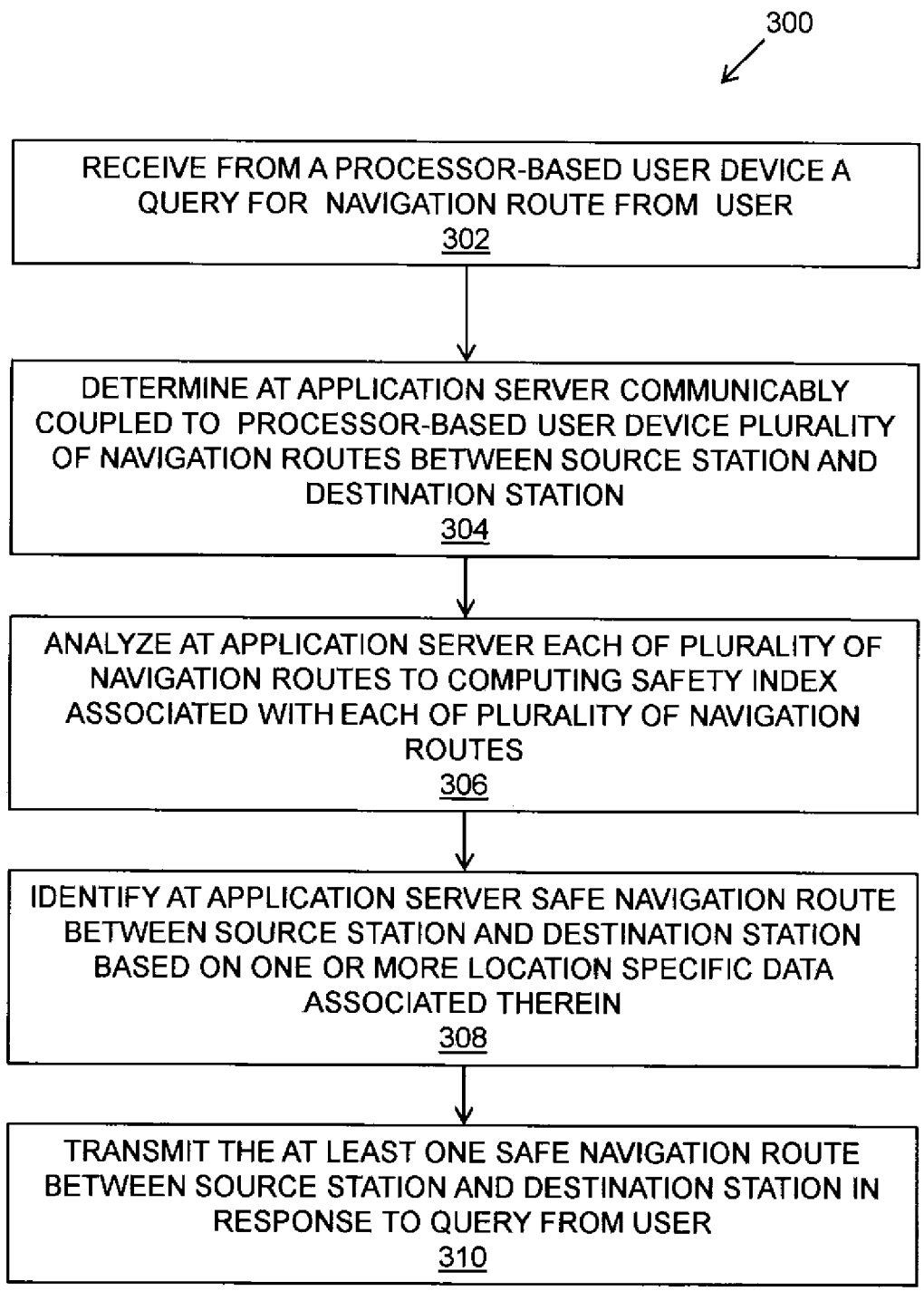
FIG. 3 is an illustration of steps of a method of providing a safe navigation route for travelling, in accordance with an embodiment of the present disclosure.

Referring to FIG. 3, there are shown steps of a method 300 of selecting a safe navigation route for traveling, in accordance with an embodiment of the present disclosure. At a step 302, a query for a navigation route from a user is received from a processor-based user device, wherein the query comprises one of a source station and a destination station. At a step 304, a plurality of navigation routes between the source station and the destination station is determined at an application server that is communicably coupled to the processor-based user device. At a step 306, each of the plurality of navigation routes is analyzed, at the application server to computing a safety index associated with each of the plurality of navigation routes, wherein the safety index is computed based on one or more location specific data associated with each of the navigation routes. The location specific data include but not limited to, desolation index, emotional index, population index, noise index, quality index, physiological index, mood index. At a step 308, at least one safe navigation route is identified at the application server, between the source station and the destination station based on one or more location specific data associated therein. At a step 310, the at least one safe navigation route between the source station and the destination station in response to the query from the user is transmitted at the graphical user interface.

The steps 302 to 310 are only illustrative and other alternatives can also be provided where one or more steps are added, one or more steps are removed, or one or more steps are provided in a different sequence without departing from the scope of the claims herein.

Figure 4:
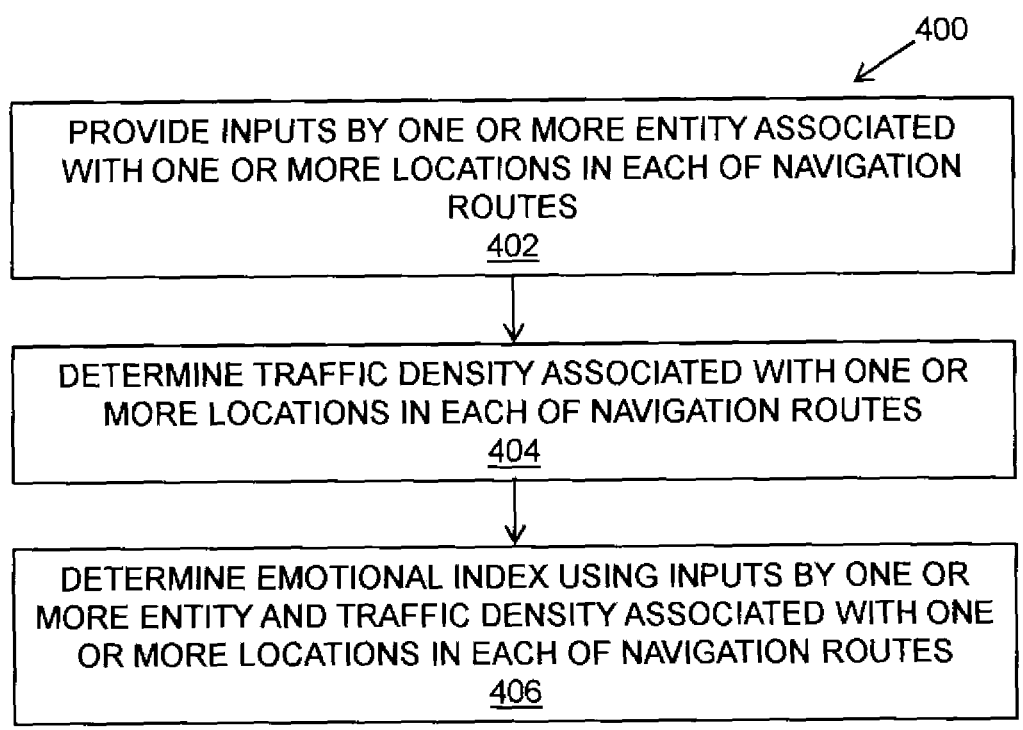
FIG. 4 is an illustration of steps of a method of determining an emotional index, in accordance with an embodiment of the present disclosure.

Referring to FIG. 4, there are shown steps of a method 400 of determining an emotional index, in accordance with an embodiment of the present disclosure. At a step 402, inputs provided by one or more entities associated with the one or more locations in each of the navigation routes are received. At a step 404, traffic density associated with the one or more locations in each of the navigation routes is determined. At a step 406, an emotional index using inputs by one or more entity and traffic density associated with one or more locations in each of navigation routes is determined.

The present disclosure provides method and system for providing a safe navigation route for traveling. The system enables the user to travel through a route wherein the security of the user is less likely to be disrupted. Furthermore, the system is operable to determine the safety of the route in real time. Therefore, the system is capable of changing a route if a sudden security issue is identified in the navigation route. Moreover, the safe navigation route is selected based on a safety index that is calculated based on various parameters that are indicative of real time values of the physical locations found within the navigation route. Therefore, the system provides improved criteria for determining the safe navigation route. Additionally, the system is easy to implement and use. Furthermore, the determination of real-time safe navigation route makes the system more efficient.

The use of the terms "a" and "an" and "the" and similar referents in the context of describing the disclosure (especially in the context of the following claims) is to be construed to cover both the singular and the plural unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein is merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

I claim:
1. A method for determining a safe navigation route programmatically for travel, comprising:
  receiving, by an application server communicably coupled to a processor-based user device, a query for a navigation route from the processor-based user device, wherein the query comprises a source station and a destination station;
  determining, by the application server, a plurality of navigation routes between the source station and the destination station;
  analyzing, by the application server, each of the plurality of navigation routes to compute a safety index associated with each of the plurality of navigation routes, wherein the safety index is a numerical value computed based on location specific data associated with each of the navigation routes, wherein the location specific data associated with each of the navigation routes comprises a desolation index, an emotional index, a population index, a noise index, a quality index, a physiological index, and a mood index, each of the desolation index, the emotional index, the population index, the noise index, the quality index, the physiological index, and the mood index being a respective numerical value;
  autonomously acquiring, by the application server, physiological data associated with one or more entities, wherein the physiological data comprises: activities associated with the one or more entities, wherein the activities associated with the one or more entities comprise a number of steps taken by an entity while walking, an amount time spent in sleeping, and an amount of time spent while performing other cartographic activities; physiological parameters associated with the one or more entities, wherein the physiological parameters comprise electrocardiography data or pulse-oximetry data of bodies of the one or more entities; and health parameters associated with the one or more entities, wherein the health parameters comprise temperature, blood pressure, and stress levels;
  computing, by the application server, the physiological index based on the physiological data;
  identifying, by the application server, at least one safe navigation route between the source station and the destination station from the plurality of navigation routes based on a ranking of the safety index computed for each of the plurality of navigation routes;
  transmitting, by the application server to the processor-based user device, the at least one safe navigation route between the source station and the destination station in response to the query; and
  suggesting, by the application server to the processor-based user device, an alternative safe navigation route between the source station and the destination station upon ascertaining a real time security issue identified in the at least one safe navigation route as transmitted, wherein the alternative safe navigation route is selected based on the safety index that is calculated based on location specific parameters that are indicative of real time values of physical locations found within the navigation route, and inputs from the one or more entities associated with specific location in real time.

2. The method according to claim 1, further comprising determining, at the application server, the safety index for a plurality of locations in the plurality of navigation routes at a predefined timestamp.

3. The method according to claim 2, further comprising computing, by the application server, the emotional index based on:
inputs provided by the one or more entities associated with the plurality of locations in each of the navigation routes; and
traffic density associated with the plurality of locations in each of the navigation routes.

4. The method according to claim 3, wherein the location specific data further comprises:
an availability of one or more safe houses at the plurality of locations in each of the plurality of navigation routes;
a noise level of the plurality of locations in each of the plurality of navigation routes; and
an illumination level at the plurality of locations in each of the plurality of navigation routes, the illumination level of a respective one of the locations being an amount of light available at the respective one of the locations.

5. The method according to claim 1, further comprising estimating, by the application server, a mood associated with a plurality of locations in each of the navigation routes at a predefined timestamp, the mood index being generated using the mood associated with the plurality of locations.

6. The method according to claim 1, further comprising selecting, at the application server, the safe navigation route for travel at real time when the query is received at the application server.

7. A system for determining a safe navigation route programmatically for travel, comprising:
at least one computing device comprising at least one hardware processor; and
program instructions stored in memory executable by the at least one hardware processor that, when executed, direct the at least one computing device to:
receive a query for a navigation route from a processor-based user device, wherein the query comprises a source station and a destination station;
determine a plurality of navigation routes between the source station and the destination station;
analyze each of the plurality of navigation routes to compute a safety index associated with each of the plurality of navigation routes, wherein the safety index is a numerical value computed based on location specific data associated with each of the navigation routes, wherein the location specific data associated with each of the navigation routes comprises a desolation index, an emotional index, a population index, a noise index, a quality index, a physiological index, and a mood index, each of the desolation index, the emotional index, the population index, the noise index, the quality index, the physiological index, and the mood index being a respective numerical value;
autonomously acquire physiological data associated with one or more entities, wherein the physiological data comprises: activities associated with the one or more entities, wherein the activities associated with the one or more entities comprise a number of steps taken by an entity while walking, an amount time spent in sleeping, and an amount of time spent while performing other cartographic activities; physiological parameters associated with the one or more entities, wherein the physiological parameters comprise electrocardiography data or pulse-oximetry data of bodies of the one or more entities; and health parameters associated with the one or more entities, wherein the health parameters comprise temperature, blood pressure, and stress levels;
compute the physiological index based on the physiological data;
identify at least one safe navigation route between the source station and the destination station from the plurality of navigation routes based on a ranking of the safety index computed for each of the plurality of navigation routes;
transmit, to the processor-based user device, the at least one safe navigation route between the source station and the destination station in response to the query; and
suggest, to the processor-based user device, an alternative safe navigation route between the source station and the destination station upon ascertaining a real time security issue identified in the at least one safe navigation route as transmitted, wherein the alternative safe navigation route is selected based on the safety index that is calculated based on location specific parameters that are indicative of real time values of physical locations found within the navigation route, and inputs from the one or more entities associated with specific location in real time.

8. The system according to claim 7, wherein the at least one computing device is further directed to determine the safety index for a plurality of locations in the plurality of navigation routes at a predefined timestamp.

9. The system according to claim 8, wherein the at least one computing device is further directed to compute the emotional index based on:
inputs provided by the one or more entities associated with the plurality of locations in each of the navigation routes; and
traffic density associated with the plurality of locations in each of the navigation routes.

10. The system according to claim 9, wherein the location specific data further comprises:
an availability of one or more safe houses at the plurality of locations in each of the plurality of navigation routes;
a noise level of the plurality of locations in each of the plurality of navigation routes; and
an illumination level at the plurality of locations in each of the plurality of navigation routes, the illumination level of a respective one of the locations being an amount of light available at the respective one of the locations.

11. The system according to claim 7, wherein the at least one computing device is further directed to determine a mood associated with a plurality of locations in each of the navigation routes at a predefined timestamp, the mood index being determined using the mood associated with the plurality of locations.

12. The system according to claim 7, wherein the at least one computing device is further directed to select the safe navigation route for travel at real time when the query is received by the at least one computing device.

13. The system according to claim 7, wherein the at least one computing device is an application server computing device.

14. A non-transitory computer-readable medium for determining a safe navigation route programmatically for travel, having program instructions stored thereon executable by at least one computing device having at least one hardware processor that, when executed, direct the at least one computing device to:

receive a query for a navigation route from a processor-based user device, wherein the query comprises a source station and a destination station;

determine a plurality of navigation routes between the source station and the destination station;

analyze each of the plurality of navigation routes to compute a safety index associated with each of the plurality of navigation routes, wherein the safety index is a numerical value computed based on location specific data associated with each of the navigation routes, wherein the location specific data associated with each of the navigation routes comprises a desolation index, an emotional index, a population index, a noise index, a quality index, a physiological index, and a mood index, each of the desolation index, the emotional index, the population index, the noise index, the quality index, the physiological index, and the mood index being a respective numerical value;

autonomously acquire physiological data associated with one or more entities, wherein the physiological data comprises: activities associated with the one or more entities, wherein the activities associated with the one or more entities comprise a number of steps taken by an entity while walking, an amount time spent in sleeping, and an amount of time spent while performing other cartographic activities; physiological parameters associated with the one or more entities, wherein the physiological parameters comprise electrocardiography data or pulse-oximetry data of bodies of the one or more entities; and health parameters associated with the one or more entities, wherein the health parameters comprise temperature, blood pressure, and stress levels;

compute the physiological index based on the physiological data;

identify at least one safe navigation route between the source station and the destination station from the plurality of navigation routes based on a ranking of the safety index computed for each of the plurality of navigation routes;

transmit, to the processor-based user device, the at least one safe navigation route between the source station and the destination station in response to the query; and suggest, to the processor-based user device, an alternative safe navigation route between the source station and the destination station upon ascertaining a real time security issue identified in the at least one safe navigation route as transmitted, wherein the alternative safe navigation route is selected based on the safety index that is calculated based on location specific parameters that are indicative of real time values of physical locations found within the navigation route, and inputs from the one or more entities associated with specific location in real time.

15. The non-transitory computer-readable medium according to claim 14, wherein the at least one computing device is further directed to determine the safety index for a plurality of locations in the plurality of navigation routes at a predefined timestamp.

16. The non-transitory computer-readable medium according to claim 15, wherein the at least one computing device is further directed to compute the emotional index based at least in part on:

inputs provided by the one or more entities associated with the plurality of locations in each of the navigation routes; and traffic density associated with the plurality of locations in each of the navigation routes.

17. The non-transitory computer-readable medium according to claim 16, wherein the location specific data further comprises:

an availability of one or more safe houses at the plurality of locations in each of the plurality of navigation routes;

a noise level of the plurality of locations in each of the plurality of navigation routes; and an illumination level at the plurality of locations in each of the plurality of navigation routes, the illumination level of a respective one of the locations being an amount of light available at the respective one of the locations.

18. The non-transitory computer-readable medium according to claim 14, wherein the at least one computing device is further directed to determine a mood associated with a plurality of locations in each of the navigation routes at a predefined timestamp, the mood index being determined using the mood associated with the plurality of locations.

19. The non-transitory computer-readable medium according to claim 14, wherein the at least one computing device is further directed to select the safe navigation route for travel at real time when the query is received.

20. The non-transitory computer-readable medium according to claim 14, wherein the at least one computing device is an application server computing device.

* * * * *